United States Patent [19]

Matson et al.

[11] Patent Number: 4,616,921
[45] Date of Patent: Oct. 14, 1986

[54] READER-PRINTER APPARATUS WITH AN IMPROVED VIEWING AND PRINT MIRROR ASSEMBLY

[75] Inventors: Gary R. Matson; Winston G. Pottle; Francis L. Soucy, all of Rochester, N.Y.

[73] Assignee: Eastman Kodak Company, Rochester, N.Y.

[21] Appl. No.: 727,992

[22] Filed: Apr. 29, 1985

[51] Int. Cl.⁴ .......................................... G03G 15/00
[52] U.S. Cl. .......................................... 355/5; 355/66
[58] Field of Search .................... 355/5, 14 R, 18, 44, 355/45, 66

[56] References Cited

U.S. PATENT DOCUMENTS

| | | | |
|---|---|---|---|
| 3,511,564 | 5/1970 | Gawin et al. | 355/3 R |
| 3,515,477 | 6/1970 | Hein et al. | 355/42 |
| 3,677,637 | 7/1972 | Van Auken et al. | 355/45 |
| 4,322,158 | 3/1982 | Frias et al. | 355/27 |
| 4,341,463 | 7/1982 | Kashiwagi et al. | 355/5 X |
| 4,367,033 | 1/1983 | Watanabe | 355/5 |
| 4,433,906 | 2/1984 | Nakatani et al. | 355/55 |
| 4,494,859 | 1/1985 | Frias et al. | |

Primary Examiner—Arthur T. Grimley
Assistant Examiner—C. Romano
Attorney, Agent, or Firm—Herman J. Strnisha

[57] ABSTRACT

A microform reader-printer apparatus which includes a slide assembly having coupled thereto a view mirror moveable between a viewing and a non-viewing position, a print mirror moveable between a print and a non-print position, and a control system including a drive motor coupled to the slide assembly for causing the control system to selectively move the slide assembly into either a predetermined viewing or printing position, and when in the printing mode, the document page selected for reproduction is printed using an electrophotographic reproduction engine.

4 Claims, 4 Drawing Figures

READER-PRINTER APPARATUS WITH AN IMPROVED VIEWING AND PRINT MIRROR ASSEMBLY

CROSS-REFERENCE TO RELATED APPLICATION

This application is related to U.S. application Ser. No. 727,996, filed on even date herein in the names of Eugene W. Lachut et al and entitled Reader-Printer Apparatus and Method for Variable Length Copying Information on a Standard Sheet Length.

FIELD OF THE INVENTION

This invention relates to an apparatus in which are incorporated, in combination, a reader for viewing microforms and a copying system for making enlargements thereof.

DESCRIPTION OF THE PRIOR ART

It is well known to produce a permanent copy of an image by the electrophotographic technique in which a uniformly charged photoconductive surface is illuminated with the image to produce variation of charge distribution on the surface, the surface then being contacted with toner particles which are preferentially attracted to the surface in dependence on the charge usage formed thereon, a permanent copy being produced from the array of toner particles thereby formed on the photoconductive surface.

One method of operating the electrophotographic technique using a reader-printer apparatus is to combine the features of an electrophotographic reproduction engine with a microfilm reader which includes an optical system for copy sheet exposure of plain paper with the image of the film carrier. There is an increasing demand for reader-printer apparatus which permits a document page in the form of a positive or a negative to be selectively handled. One known reader-printer apparatus of this type is the RP 505 manufactured by Minolta Camera Co., Ltd. of Osaka, Japan. This reader-printer apparatus includes an optical system for imaging a microform such as a film strip or a microfiche onto a screen during a viewing mode and an electro-photographic reproduction engine for reproducing enlargements of the microform onto copy sheets of plain paper.

One of the disadvantageous features of this apparatus is that the existing optical path is not able to accept one or more microfilm images in rapid succession, and thus such an arrangement adversely effects the printing rate. Furthermore, it was found that with the known reader-printer apparatus, repetitive movement of the mirrors could not be relied upon to be in the correct viewing and printing position with the necessary degree of reliability.

It is therefore the object of the invention to provide a reader-printer apparatus having an improved and reliable viewing and printing mirror assembly which is capable of producing copies at a faster rate, while at the same time providing reliable control of the viewing and printing location of the viewing and printing mirrors. The improved mirror assembly further provides a simple mechanically operating arrangement which results in consistently reliable and repetitive location of the mirrors wherein said simplicity in design results in improved serviceability.

SUMMARY OF THE INVENTION

According to the present invention, the above objects are achieved by a reader-printer apparatus for viewing and reproducing a microform image including means for projecting an enlarged image of the microform image onto a view screen; means for projecting microform image modulated light; and a copier means having a photoconductive member, for receiving such projected image modulated light to produce a latent image, and image processing means for reproducing a visible image from such latent image on a copy sheet, the improvement comprising:

a mirror assembly which includes a view mirror moveable between viewing and non-viewing positions, a print mirror moveable between print and non-print positions, control means effective in a first state to moving said viewing mirror to its viewing position and said print mirror to its non-print position and effective in a second state to move said view mirror to its non-viewing position and said print mirror to its print position; and motor driving means coupled to said mirror assembly for selectively causing said control means to be effective in either the first or second states.

The present invention is further characterized wherein said photoconductive member is moveable about a closed path and said copier means including corona charging means for electrostatically charging said photoconductive member, and means for incrementally exposing the member to a projected image modulated light to form the latent image.

BRIEF DESCRIPTION OF THE DRAWINGS

In the detailed description of the preferred embodiment of the invention presented below, reference is made to the accompanying drawings, in which.

DETAILED DESCRIPTION OF THE PREFERRED EMBODIMENT

Figure 1:
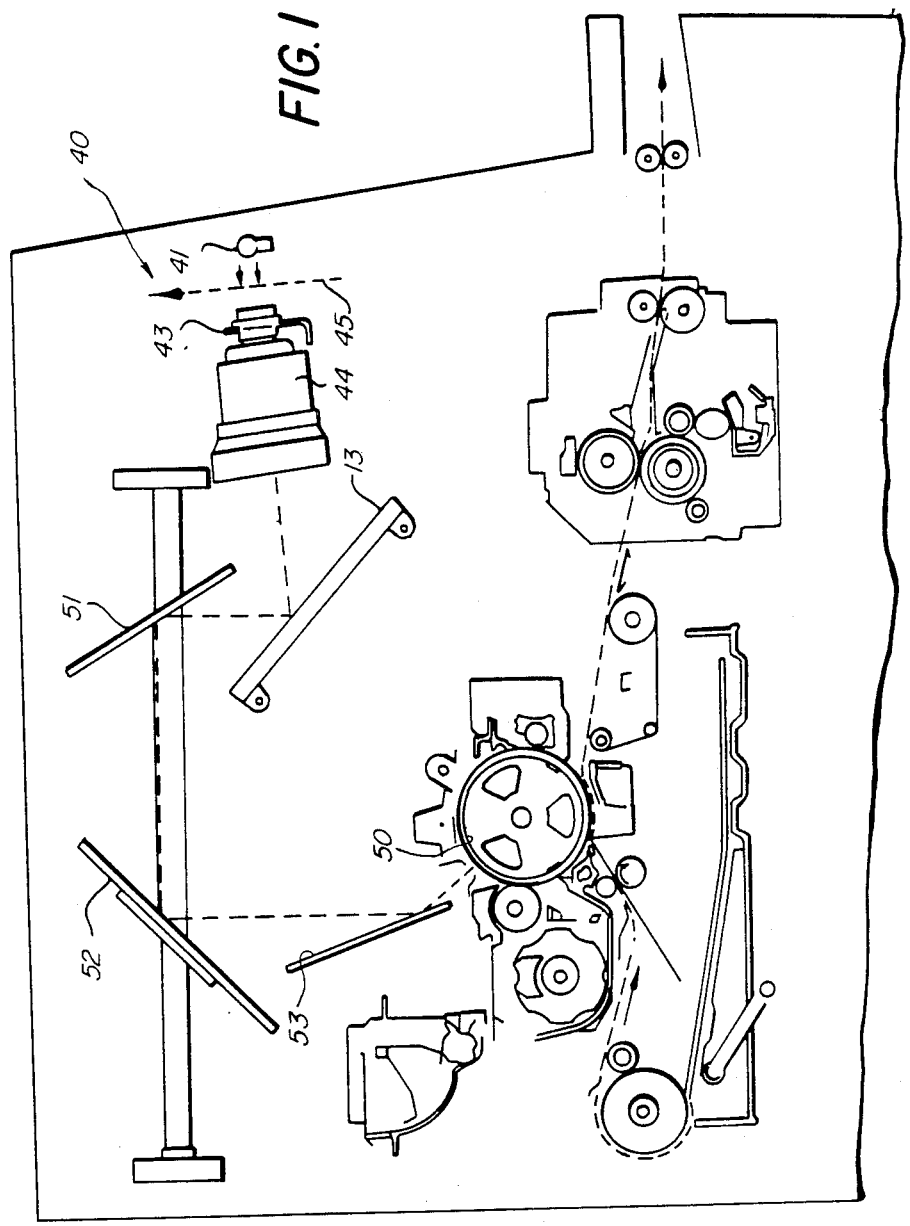
FIG. 1 is a diagrammatic side elevation view showing a portion of the functional components of an improved reader-printer apparatus.

Because the reader-printer apparatus of the type described herein is well known, the present description will be directed in particular to elements forming part of or cooperating more directly with the present invention. Elements of the reader-printer apparatus not specifically shown or described herein are selectable from those known in the prior art.

The "preferred embodiment" of the present invention is illustrated by way of example in FIGS. 1-4. With specific reference to FIGS. 1 and 3 a microfilm such as 45 is located by conventional means in a film gate, such as film transport assembly 40, wherein the viewing mode is illuminated by projection lamp 41, light is reflected by mirror 42, passes through the microfilm image and then passed through a projection lens 43, to project an image onto the screen by means of the viewing mirror assembly 60 (see FIG. 3).

The use of a dove prism 44 is well known in the art allowing the operator to turn the image 360° when viewing and making copies.

Figure 2:
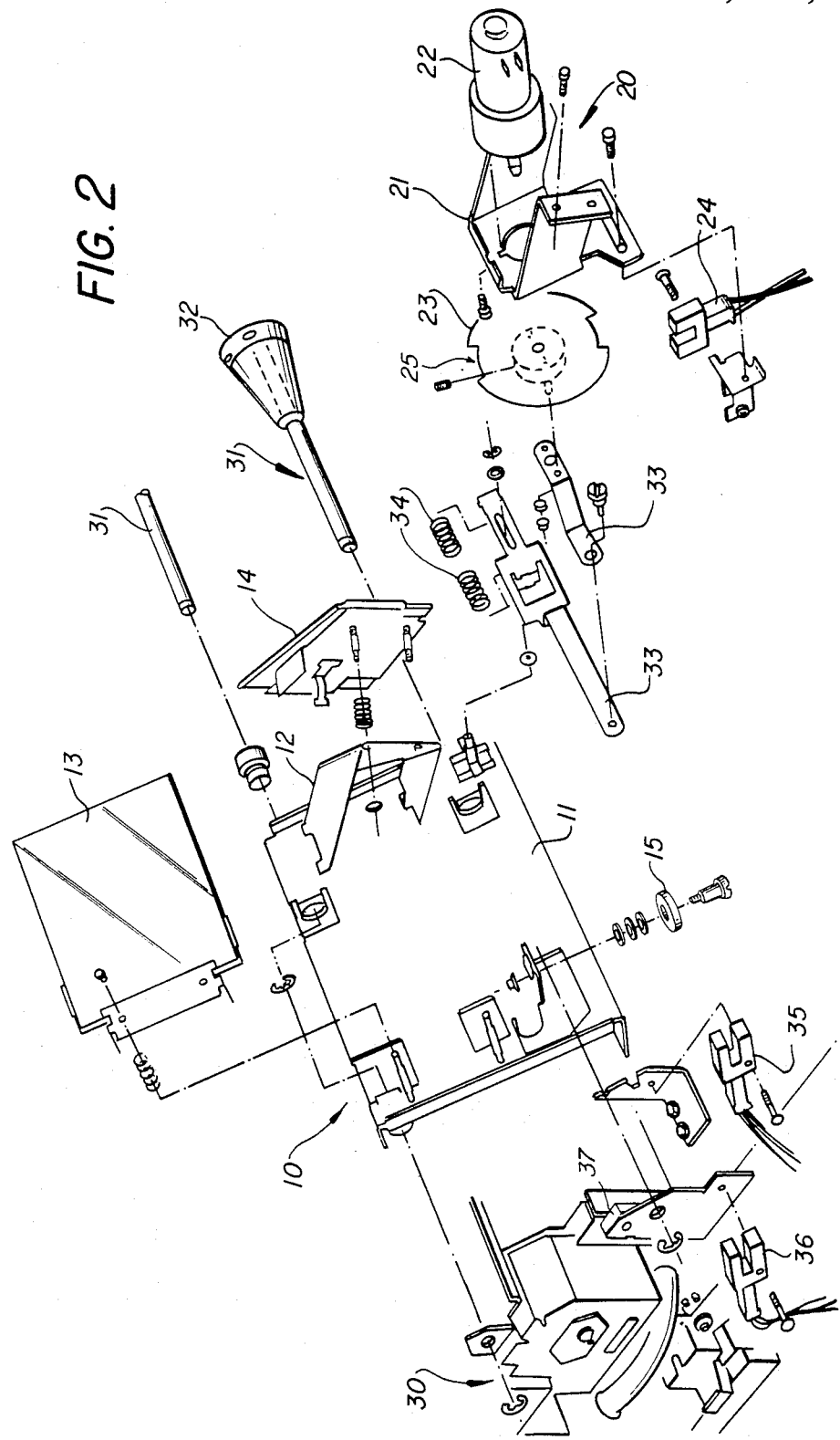
FIG. 2 is a prospective view of an improved reader-printer mirror assembly constructed in accordance with the invention.

Mirror assembly 10 illustrated in FIG. 2 includes a track assembly 30 and a drive motor assembly 20. The mirror assembly consists, mainly, of two mirrors, print mirror 13 and viewing mirror 14. Each mirror is attached to a frame 11 and 12 respectively. Viewing mirror 14 is mounted on frame 12 at three spring loaded points, two of which are adjustable. Frame 12 in turn is permanently attached to frame 11. This arrangement allows the viewing mirror to be adjusted for optimum reflection of the image to the reflecting mirror 63 (see FIG. 3).

Print mirror 13, as shown in FIG. 2, is mounted to frame 11 with three spring loaded bolts all of which are adjustable. The adjustable bolts are used to position the mirror for optimum reflection in order to achieve the correct scanning position for scan optic mirrors 51 and 52.

The mirror assembly 10 is driven along two guide shafts 31 by the drive motor 22 through a crank mechanism 33 to either of two predetermined positions; one for viewing and one for printing. The mirror assembly 10 has spring loaded connectors 34 that compress when they hit rubber bumpers 37, at the end of its travel. This fail-safe feature provides the mirror assembly 10 with a large tolerance for movement into the correct position by eliminating the "improper positioning" caused by variation in the drive mechanism. Furthermore, to assure repeatable and reliable movement of the mirror assembly 10 into its "print" position a free wheeling bearing 15 is mounted on the mirror assembly. As the mirror assembly moves toward the "print" position the bearing 15 moves into contact with a tapered sleeve 32 mounted on the lower guide shaft 31 until it secures the mirror assembly in the correct "print" position thus preventing the mirror assembly from moving during the printing operation.

Two reed switches 35 and 36 are placed along the travel path of the mirror assembly to sense its position when moving from a "print" position to the "view" position. Switch (36) informs the logic system when the mirror assembly has left or entered a predetermined location. Switch (35) is wired in series with a scan clutch to prevent the scan mirror 51 and 52 from moving when the mirror assembly is in the "view" position.

Referring further to the drive motor assembly 20, this mechanism comprises the drive motor 22, drive motor disc 23, drive motor frame 21 and drive motor switch 24. The drive motor is independent of the printer's main drive system and as stated before, drives the mirror assembly 10 to either a "print" or "view" position. These positions are determined from cut out slots 25 on motor disc 23 which are sensed by drive motor switch 24 which informs the logic system when to stop the motor drive. When the mirror assembly passes through the reed switch 36, a signal is sent to the logic system indicating the position it is in by sensing the presence or absence of metal when contacting frame 11. If reed switch 36 senses metal in its first state, the mirror assembly is in the "view" position. If reed switch 36 does not sense metal, it is in a second state and the mirror assembly is in the "print" position. The logic system also provides that if the print mirror is not in a known position, the logic and control will drive the assembly to the desired position.

OPERATION OF THE INVENTION

Figure 3:
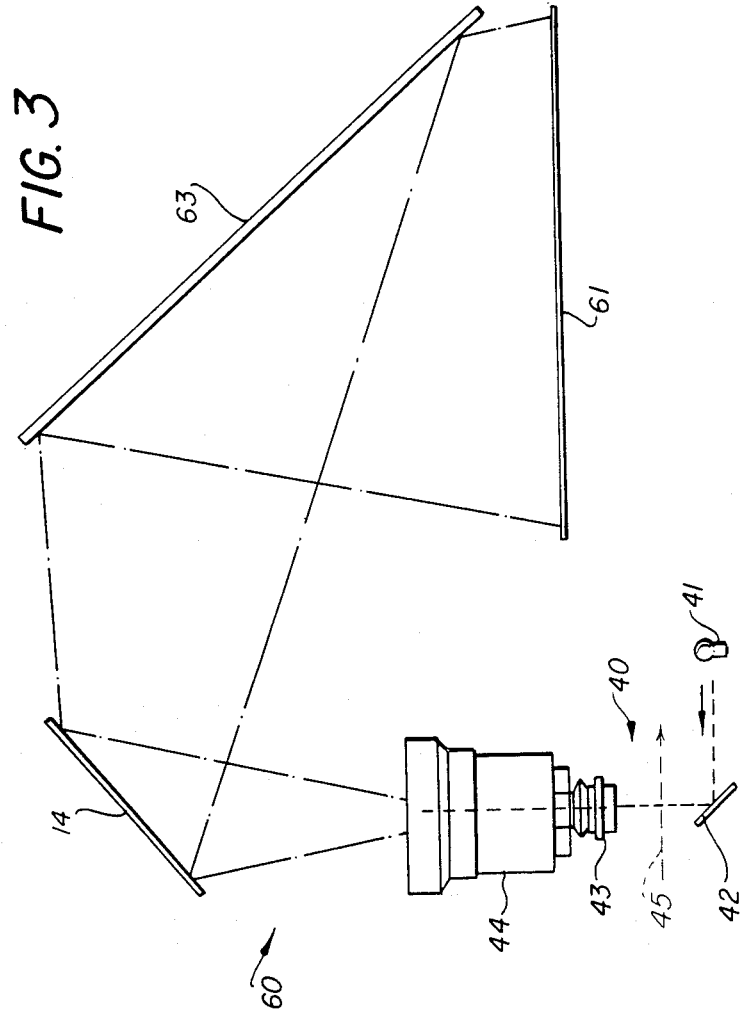
FIG. 3 is a top view at 15° from vertical of a viewing mirror assembly constructed in accordance with the invention.

When the reader-printer is placed in an operating mode the mirror assembly 10 is usually positioned in its first state as illustrated in FIG. 3, a "view" position. Viewing mirror 14 is positioned in a viewing mode to receive the image illuminated by the projection lamp 41. The image is then reflected by mirrors 14 and 63 to the viewing screen 61.

Figure 4:
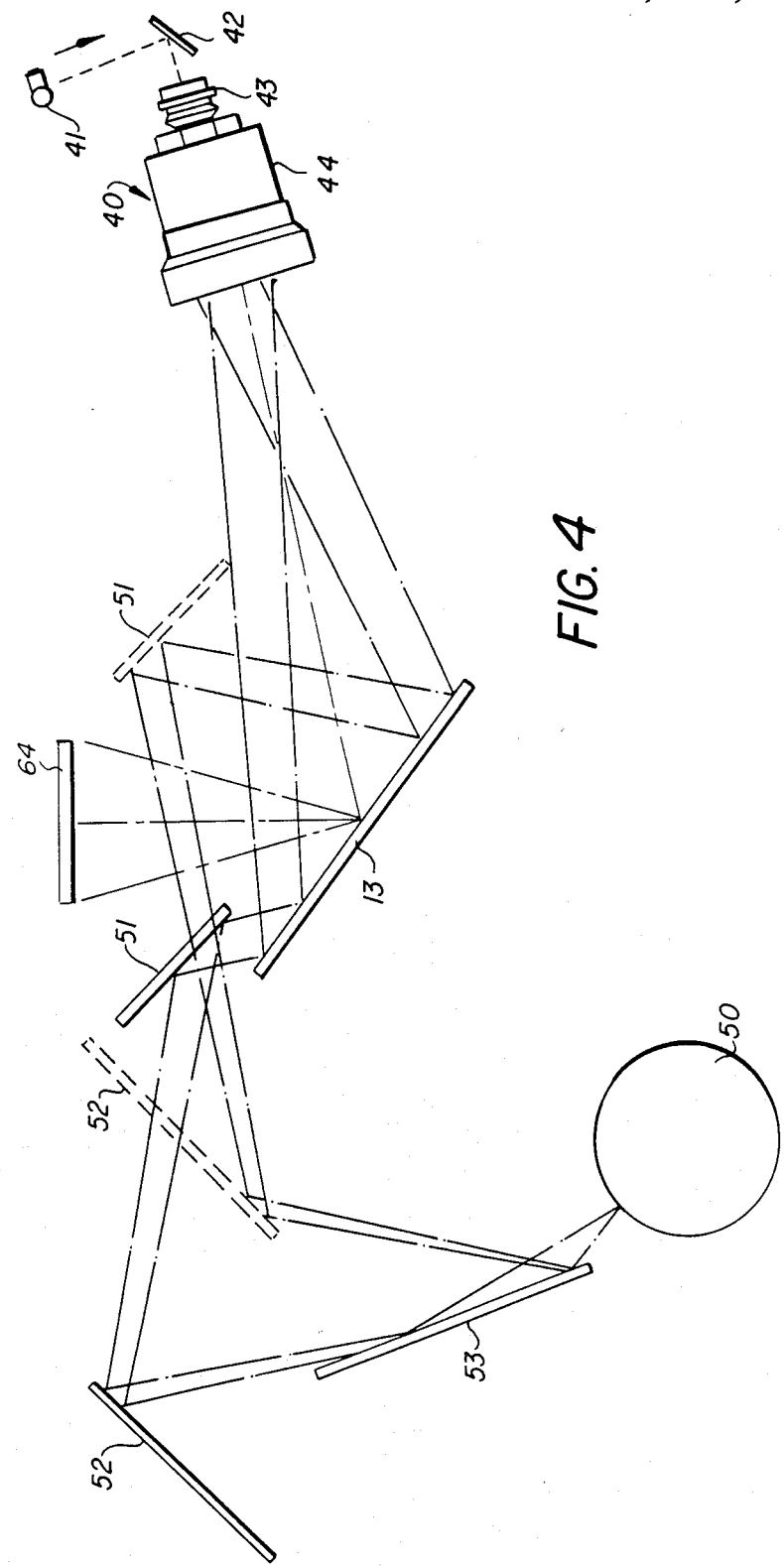
FIG. 4 is a side view of the printing mirror assembly constructed in accordance with the invention.

When a copy of a document page is desired, an operator depresses a Print Button on the control panel which actuates the mirror assembly 10 into a printing mode or second state as illustrated in FIG. 4. In the print mode, print mirror 13 supported on horizontally disposed guide rails 31 moves into position in front of the film transport assembly 40.

This light path is established to allow the light which has passed through the microfilm 45 and projection lens 43 to illuminate the Sensor for the Automatic Exposure Control System 64 directly for just an instant. During this instant, the Sensor measures the amount of light and relays this information to the Automatic Exposure Control System. Thereby, the voltage applied to the Projection lamp 41 is raised or lowered so that the amount of light produced by the lamp is controlled. This procedure is repeated for every copy made so that fluctuation in the voltage produces no change in the density of the image produced. The image from the microfilm is then scanned by mirrors 51 and 52 and reflected by mirror 53 through a slit and incrementally exposes a line at a time onto the surface of the revolving photoconductive drum 50. A latent image of the document page is electrostatically formed on the photoconductive drum, developed and transferred to a copy sheet e.g. a plain sheet of paper.

The advantages resulting from an improved mirror assembly consist of a unique combination of a "view" mirror and a "print" mirror, comprising an independent motor drive that is responsive to improved logic commands which has resulted in a significantly improved system for a reader-printer apparatus. The inventive mirror assembly results in an ability to make copies at a faster rate, provide reliable and repeatable control of mirror location and improve overall serviceability of the mirror assembly and optical system.

The invention has been described in detail with particular reference to preferred embodiments thereof, but it will be understood that variations and modifications can be effected with the spirit and scope of the invention.

We claim:

1. Reader-printer apparatus for viewing and reproducing a microform image including means for projecting an enlarged image of the microform image onto a view screen; means for projecting microform image modulated light; and copier means having a photoconductive member for receiving such projected image modulated light to produce a latent image, and image processing means for reproducing a visible image from such latent image on a copy sheet, the improvement comprising:

a mirror assembly which includes a view mirror moveable between viewing and non-viewing positions, a print mirror moveable between print and non-print positions, control means effective in a first state to move said viewing mirror to its viewing position and said print mirror to its non-print position and effective in a second state to move said view mirror to its non-viewing position and said print mirror to its print position; and motor driving means coupled to said mirror assembly for selectively causing said control means to be effective in either the first or second states.

2. The reader-printer apparatus of claim 1 wherein said control means includes reed switch means for producing a first signal when said view mirror is in its viewing position and a second signal when said print mirror is in its print position, said control means including means responsive to said first and second signals for operating said motor driving means.

3. The reader-printer apparatus according to claim 2 wherein said control means includes bearing means effective when said print mirror is in its print position to fixedly hold said print mirror in its print position.

4. The reader-printer apparatus of claim 1 wherein said photoconductive member is moveable about a closed path and said copier means includes corona charging means for electrostatically charging said photoconductive member, and means for incrementally exposing the member to the projected image modulating light to form the latent image.

* * * * *